Patented Sept. 25, 1923.

1,468,831

UNITED STATES PATENT OFFICE.

SAMUEL H. PARRISH, OF CHICAGO, ILLINOIS, ASSIGNOR, BY DIRECT AND MESNE ASSIGNMENTS, TO S. H. PARRISH COMPANY, OF CHICAGO, ILLINOIS, A CORPORATION OF ILLINOIS.

COMPOSITION FOR TREATING PAPER.

No Drawing.    Application filed February 6, 1922. Serial No. 534,602.

*To all whom it may concern:*

Be it known that I, SAMUEL H. PARRISH, a citizen of the United States, residing at Chicago, county of Cook, State of Illinois, have invented certain new and useful Improvements in Compositions for Treating Paper, of which the following is a specification.

The present invention is in the nature of an improvement on a somewhat similar composition described and claimed by me in my application No. 302,219, filed June 6, 1919. In said application was described a solution of fir balsam, turpentine and "Carbona" (or carbon tetrachlorid) for the purpose of impregnating paper in order to make it transparent. The composition there described has been very successful for the purpose in view, but has a tendency to leave the paper after it becomes dry in a slightly inflexible condition and inclined toward brittleness. It is an object of the present invention to provide a similar composition which, when applied to paper, will make it equally transparent and at the same time leave it tough and flexible and of permanent transparency. My improved composition has the further advantage that papers treated therewith do not alter, darken or change color for long periods of time as ascertained by actual trial but maintain their original appearance, transparency and color. When moderately dry and at ordinary temperatures, the paper to which my improved composition has been applied, is not sticky and may be freely handled or brought into close contact with other sheets of the same material or other materials without sticking. When moistened and slightly warmed however, paper treated with my improved composition will firmly adhere to smooth surfaces to which it is applied with pressure and it will continue to adhere after it is cooled and dried out. It is, furthermore, substantially water-proof and the above described characteristics adapt it for use in advertising matter and the like, to be applied to show windows, show cases, etc., in the form of letters, figures and the like.

My improved composition consists of the well-known soya bean oil, "Carbona" (carbon tetrachlorid), turpentine and fir balsam. The precise proportions of these materials depend upon the particular qualities most desired in the paper, to which they are applied. If great flexibility and toughness are required, more of the soya bean oil and "Carbona" are used, but if less flexibility is desired and any considerable adhesiveness is to be avoided, more fir balsam and turpentine are used. A preferred formula for my composition is as follows:

| | Parts. |
|---|---|
| Soya bean oil | 1 |
| Tetrachlorid of carbon | 3 |
| Turpentine | 4 |
| Fir balsam | 8 |

For the best results the bean oil and "Carbona" are thoroughly stirred together and the balsam and turpentine are likewise stirred together and then the two solutions so formed are well mixed together. The liquid is then ready to be applied. In case the liquid is to be used for the production of lettering on show windows or the like, the material is applied to paper which is so impregnated or covered with opaque coloring matter that the application of the composition does not render it translucent. The required letters are then cut out of the paper and are moistened and slightly heated and applied to the glass with a pressure sufficiently firm to press out any air from between the glass and the paper. It is sufficient then to let the letters cool down and dry out and they are thus permanently attached to the glass. If gilt lettering is desired it is sometimes preferable to cut out the letters from gilt paper or the like and apply an overlapping backing of paper to which my improved composition has been applied so that when the letter is moistened and slightly heated and applied to the glass the margins of the backing overlap the gilt and adhere to the glass. The gilt is thus well protected from the air and will not tarnish.

I claim:—

1. A composition of matter for the purpose set forth, comprising soya bean oil, tetrachlorid of carbon, turpentine and fir balsam.

2. A composition of matter for the purpose set forth, comprising approximately one part of soya bean oil, three parts tetrachlorid of carbon, four parts turpentine and eight parts fir balsam.

3. A composition of matter for the purpose set forth, comprising soya bean oil, a solvent of soya bean oil, fir balsam and a solvent of fir balsam.

4. A process of making a composition of matter for the purpose set forth, comprising mixing soya bean oil and a solvent thereof, mixing fir balsam and a solvent thereof and adding together the two solutions formed.

5. A process of making a composition of matter for the purpose set forth, consisting in mixing substantially one part of soya bean oil with substantially three parts of tetrachlorid of carbon, mixing substantially eight parts of fir balsam with substantially four parts of turpentine and then adding together the two solutions so formed.

SAMUEL H. PARRISH.